United States Patent [19]

Schmidt

[11] 4,365,942
[45] Dec. 28, 1982

[54] LIQUID HELIUM PUMP

[75] Inventor: Curt Schmidt, Karlsruhe, Fed. Rep. of Germany

[73] Assignee: Kernforschungszentrum Karlsruhe GmbH, Karlsruhe, Fed. Rep. of Germany

[21] Appl. No.: 217,518

[22] Filed: Dec. 15, 1980

[30] Foreign Application Priority Data

Jan. 29, 1980 [DE] Fed. Rep. of Germany ....... 3003024

[51] Int. Cl.³ ............................................. F04B 45/00
[52] U.S. Cl. .................................... 417/412; 310/15; 417/419; 417/472
[58] Field of Search ............................. 417/415–418, 417/412, 413, 419, 472, 473, 529, 533–537, 539; 310/15, 17, 19

[56] References Cited

U.S. PATENT DOCUMENTS

| | | | |
|---|---|---|---|
| 1,572,126 | 2/1926 | Bothner | 417/418 |
| 2,061,869 | 11/1936 | Gilbert et al. | 417/418 |
| 2,951,450 | 9/1960 | Fisher | 417/473 X |
| 3,422,765 | 1/1969 | Schoch | 417/418 |
| 3,867,675 | 2/1975 | Kitz et al. | 310/15 X |

FOREIGN PATENT DOCUMENTS 53-68410 6/1978 Japan .................. 417/412

OTHER PUBLICATIONS

"A Reciprocating Liquid Helium Pump Used for Forced Flow of Supercritical Helium" by G. Krafft et al., Cryogenics, Feb. 1978.
"Heat Transfer by the Circulation of Supercritical Helium" by H. H. Kolm et al., Advances in Cryogenic Engineering, vol. 11, Plenum Press, New York, 1965.
"An Electrically Pumped Liquid Helium Transfer System" by B. Darrel et al., Advances in Cryogenic Engineering, vol. 11, Plenum Press, New York, 1965.

*Primary Examiner*—William L. Freeh
*Assistant Examiner*—Edward Look
*Attorney, Agent, or Firm*—Spencer & Kaye

[57] ABSTRACT

A pump includes a pump housing defining a pumping chamber and having two opposite end walls and a piston arranged in the pumping chamber for alternating motion towards and away from the end walls for drawing a cryogenic liquid into and driving it out of the pumping chamber. There are further provided first and second superconducting energizing coils mounted on respective end walls for generating a radial electromagnetic field in the pumping chamber. The energizing coils are coaxial with the piston axis. A superconducting control coil is fixedly mounted on the piston for generating a further magnetic field in the pumping chamber. The control coil is coaxial with the piston axis. The energizing coils and the control coil form part of an electromagnetic drive for generating, in the pumping chamber, an electromagnetic force which propels the piston back and forth between the end walls. Further, a bellows is affixed to peripheral regions of the piston and to the end walls for enclosing the pumping chamber.

8 Claims, 7 Drawing Figures

LIQUID HELIUM PUMP

BACKGROUND OF THE INVENTION

This invention relates to a pump; more particularly to a liquid helium pump having a superconducting electromagnetic drive which includes two stationary superconducting coils connected to the pump housing and a superconducting coil which is movable by means of the field generated by the stationary coils and which is fixedly attached to the pumping member proper of the pump.

Pumps of the above-outlined type are needed for driving liquid or supercritical helium in a closed circuit or, in general, for displacing liquid helium.

Particularly in the field of fusion technology, the use and operation of coreless fusion magnets are indispensable. The coils of the fusion magnets—which generate magnetic fields of a flux density in the order of a few Tesla—are frequently constituted by hollow superconductors, which may have a length up to 1,000 m and which are to be cooled with single phase supercritical helium. The displacement of the helium is effected at a pressure above 2.4 bar and at a temperature of approximately 4.2 K. The pressure difference between inlet and outlet is in the order of magnitude of 1 to 4 bar.

In an article entitled "A Reciprocating Liquid Helium Pump Used for Forced Flow of Supercritical Helium" by G. Krafft et al. (Cryogenics, February 1978), there is disclosed a piston pump for driving liquid helium. The pump drive is arranged externally of the cryostat and therefore the piston rod has to pass through the cryostat wall. Such an arrangement requires a vacuumtight and heliumtight seal and is involved with substantial expense. These difficulties are circumvented in another known liquid helium pump described in an article entitled "Heat Transfer by the Circulation of Supercriticial Helium" by H. H. Kolm et al. (Advances in Cryogenic Engineering, Volume 11, Plenum Press, New York, 1965). In this arrangement, the ferromagnetic piston is, with bellows, accommodated in a pump housing and a solenoid for driving the piston is arranged externally of the pump housing. The pump housing which necessarily is made of a non-magnetic material, on the one hand, increases the gap between the solenoid and the piston and, on the other hand, it does not eliminate undesired effects of foreign (external) magnetic fields. It is another disadvantage of this type of pump that it has only a small output of approximately 6.4 cm$^3$/s.

In an article entitled "An Electrically Pumped Liquid Helium Transfer System" by B. Darrel et al. (Advances in Cryogenic Engineering, Volume 11, Plenum Press, New York, 1965), there is disclosed a liquid helium pump wherein the superconducting driving coil is a disc coil mounted at an end of a bellows-equipped superconducting niobium piston received in the pump housing. The piston is moved by the driving coil by attraction and repulsion. The forces exerted on the piston are limited by the relatively low critical field of niobium of about 0.6 Tesla. An operation of this type of pump in external magnetic fields above this field value is not possible. The output of this pump too, is low; it is only approximately 7 cm$^3$/s.

SUMMARY OF THE INVENTION

It is an object of the invention to provide an improved pump, particularly a liquid helium pump whose superconducting driving arrangement is free from structural components passing through the pump housing; further, which is capable of an interference-free operation even in strong foreign magnetic fields of a flux of several Tesla and which, at a given appropriate capacity has a constant differential pressure between the pump inlet and the pump outlet and thus has a constant flow rate, and further which, at the same time, has a large capacity, a large differential pressure between the inlet and the outlet of the pump, as well as a high efficiency.

This object and others to become apparent as the specification progresses, are achieved by the invention, according to which, briefly stated, the pump includes a pump housing defining a pumping chamber and having two opposite end walls and a piston arranged in the pumping chamber for alternating motion towards and away from the end walls for drawing liquid into and driving it out of the pumping chamber. There are further provided first and second energizing coils mounted on respective end walls for generating a first and a second electromagnetic field in the pumping chamber. The energizing coils are coaxial with the piston axis. A control coil is fixedly mounted on the piston for generating a third magnetic field in the pumping chamber. The control coil is coaxial with the piston axis. The energizing coils and the control coil form part of an electromagnetic drive means for generating, in the pumping chamber, an electromagnetic force which propels the piston back and forth between the end walls. Further, a bellows is affixed to peripheral regions of the piston and to the end walls for enclosing the pumping chamber.

The advantages achieved by the invention reside particularly in that with simple means there can be provided a compact liquid helium pump of large capacity which operates in a reliable manner even in strong foreign magnetic fields and which has an efficiency close to 100%.

DESCRIPTION OF THE PREFERRED EMBODIMENT

Figure 1:
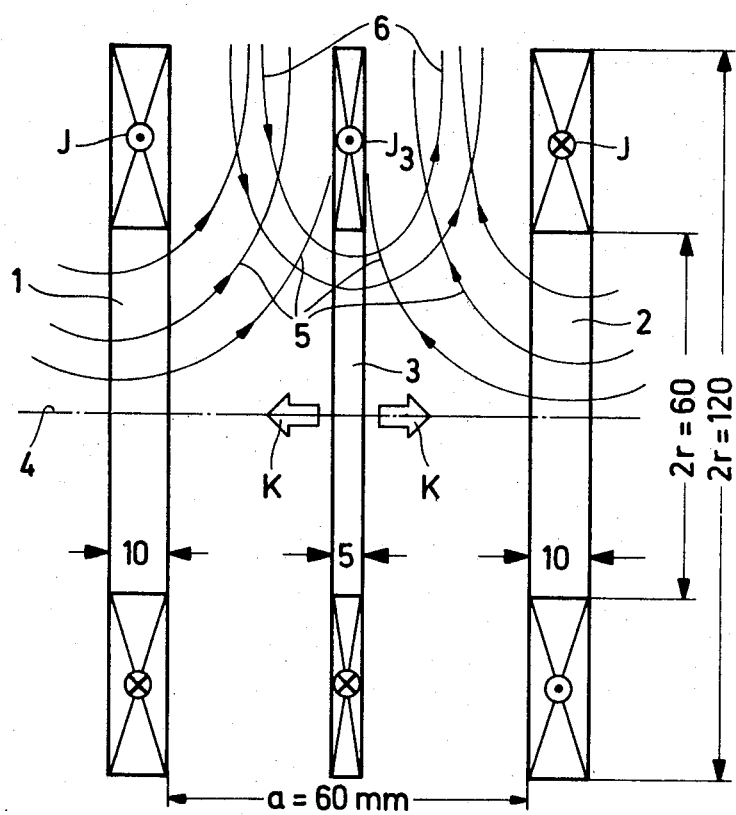
FIG. 1 is a diagrammatic illustration of the mutual relationship and exemplary dimensions of coils forming part of the invention.

Turning first to FIG. 1, there are illustrated two stationary superconductive energizing coils 1 and 2 and a movable superconductive control coil 3 arranged therebetween.

Figure 2:
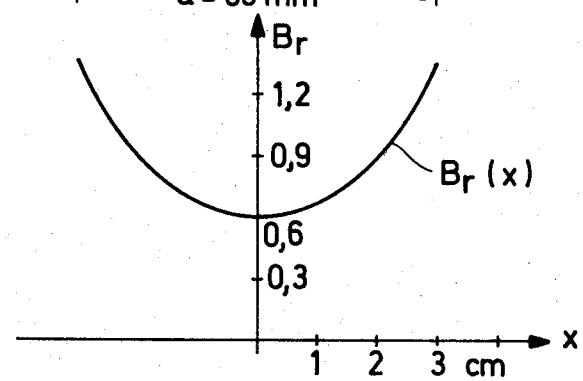
FIG. 2 is a diagram illustrating the average radial field strength (generated by the energizing coils in the zone of the control coil) as a function of the axial excursion of the control coil.

The two energizing coils 1 and 2, maintained at a predetermined distance a from one another and the control coil 3 are structured as disc coils and are arranged coaxially with one another and thus have a common axis 4. In the energizing coils 1 and 2 there flow constant currents J of identical magnitude but opposite direction. As a result, this current flow in the two coils 1 and 2 generates an electromagnetic field 5 shown above the axis 4. Between the energizing coils 1 and 2, in the zone of the control coil 3, the electromagnetic field 5 extends such that its principal component is oriented in the radial direction. The average radial field component in the zone of the control coil 3 is $B_r$. This radial field $B_r$ is a function of the excursion x of the control coil 3 and has a minimum in the midpoint between the two energizing coils 1 and 2, as shown in FIG. 2.

In the control coil 3 there flows a variable current $J_3$ of alternating direction, generating an electromagnetic field 6. By virtue of the superposition of the magnetic fields 5 and 6 there results a force K which is oriented in the direction of the axis 4 of the control coil 3. The direction and the magnitude of the force K is determined by the direction and magnitude of the current $J_3$ flowing in the control coil 3.

In case of a current density of $J = 30$ kA/cm² in each energizing coil 1 and 2 the latter generate an average radial field strength $B_r$ in the zone of the control coil 3. FIG. 2 illustrates the field strength $B_r$ as a function of the excursion x of the control coil 3. The data shown in FIG. 2 apply to the geometrical data given for the coils in FIG. 1.

The force affecting the control coil 3 is $$K = n \cdot J_3 \cdot l \cdot B_r$$

where n is the number of turns of the control coil 3 and l is the average coil radius multiplied by $2\pi$. Or, $$K = j_3 \cdot s \cdot l \cdot B_r$$

if $j_3$ is the current density in kA/cm² and s is the winding cross section of the control coil 3.

In case of a current density of $j_3 = 30$ kA/cm² in the control coil 3, there is obtained, in the mid position (that is, $x = 0$ and $B_r = 0.6$ T) a force K of approximately 7600 Newton affecting the control coil 3.

The force K increases proportionately to $B_r$ as the excursion x of the control coil 3 increases from its mid position. Therefore, it is expedient not to maintain constant the current density $j_3$ in the control coil 3 during one stroke and then rapidly reverse it at the end of a stroke, but rather to adapt the current density to the increasing field intensity $B_r$, to ensure that the force K affecting the control coil 3 remains constant.

Figure 3:
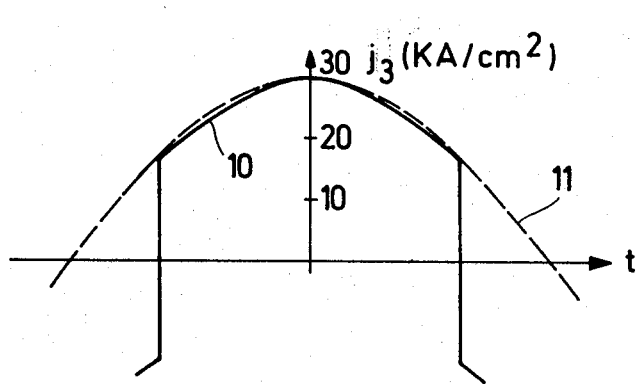
FIG. 3 is a diagram illustrating the current density in the control coil as a function of time.

In FIG. 3, the current density $j_3$ of the control coil 3 is shown as the function of time t and has a course 10 such as to maintain K constant independently from the excursion x of the control coil 3. The abrupt current density reversal at the end of the stroke of the control coil 3, however, has to be avoided in order to reduce AC losses and in order to increase the electrodynamic stability of the superconducting coils. For this reason a smooth current course, for example, following a cosine curve 11 is more advantageous.

With a driving mode discussed above, the maximum force K is generated approximately during 65% of the duration of one cycle. For the remainder of the period the pump efficiency is zero when the end position of the piston is reached or, in case such end position is not yet reached by the piston, there is only a reduced pump efficiency. This, however, is without any adverse effect in most pump applications. In particular instances, if required, several identically arranged coil assemblies may be driven in a parallel connection with a phase shift, so that the pump efficiency of the entire assembly becomes, to a large measure, independent from the excursion of the control coils.

Figure 4:
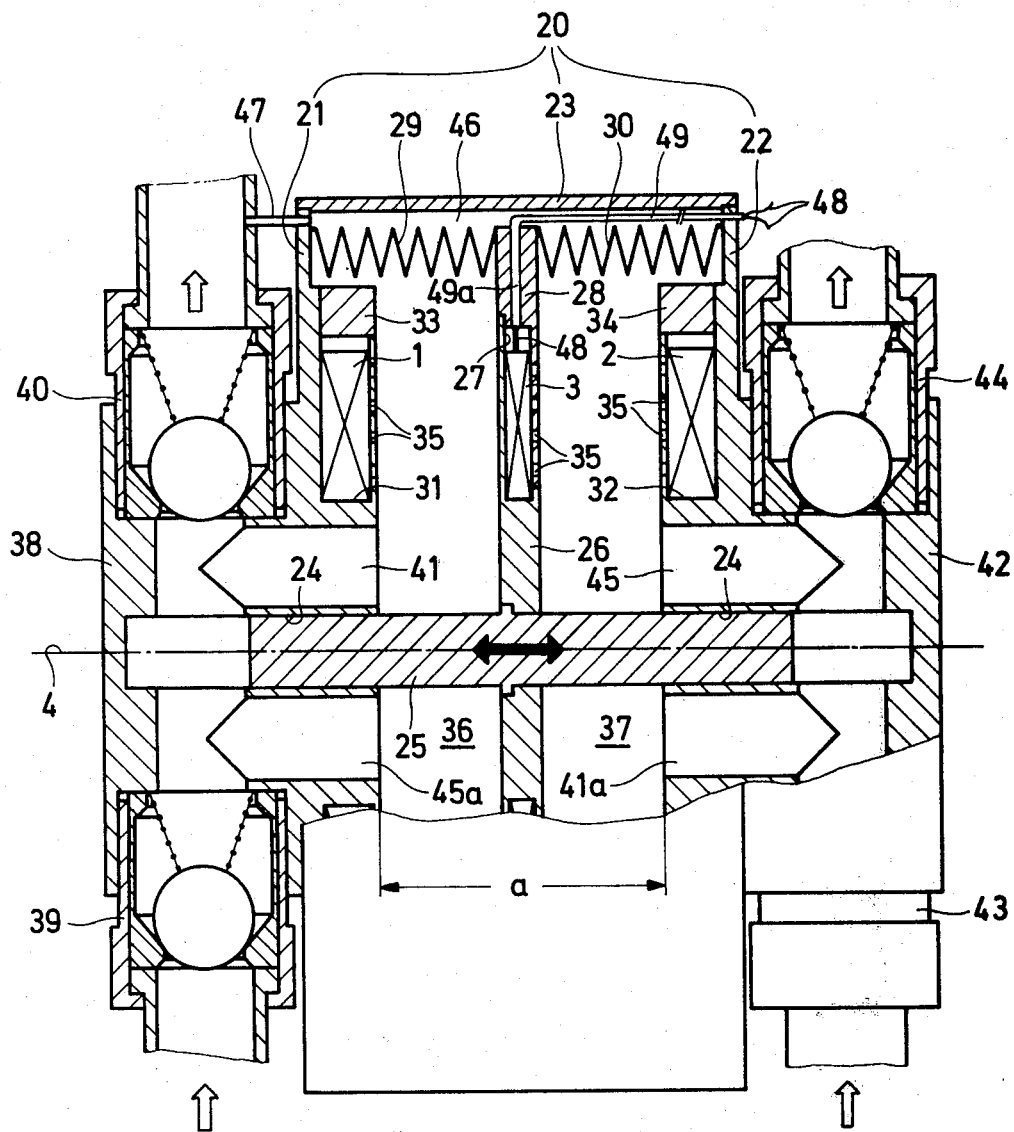
FIG. 4 is a schematic sectional view of a liquid helium pump according to a preferred embodiment of the invention.

A preferred embodiment of a liquid helium pump according to the invention is shown in FIG. 4. The structure illustrated therein is a welded one; it is to be understood that, for example, screw connections with appropriate seals instead of welds may be used without changing the structural principle of the liquid helium pump according to the invention.

A pump housing 20 is of rotationally symmetrical structure and comprises disc-shaped end walls 21, 22 which are connected with one another along their periphery by a ring 23 such that the connection is tight to liquid helium. The end walls 21, 22 are identical, rotationally symmetrical components whose axes coincide with the axis 4. The end walls 21 and 22 have aligned central bores 24 for the passage of a piston rod 25 of a pump piston 26 which, in turn, is of circular disc shape and accommodates the central coil 3 in a peripheral annular groove 27. The annular groove 27 is closed by a ring 28 welded to the pump piston 26. The outer periphery of the ring 28 is connected to the end wall 21 by a bellows 29 and to the end wall 22 by a bellows 30.

The end wall 21 has an annular groove 31 which accommodates the energizing coil 1, while the end wall 22 has an annular groove 32 in which there is arranged the energizing coil 2. The annular groove 31 is closed by a ring 33 welded to the end wall 21, whereas the annular groove 32 is closed by a ring 34 welded to the end wall 22.

The axis of the pump piston 26 coincides with the axis 4 of the coils 1, 2 and 3.

In the zone of the annular groove 27 the pump piston 26 is provided with bores 35 through which liquid helium may flow and immediately contact the superconducting control coil 3. Similar bores 35 are provided in the end walls 21 and 22 at their inner side oriented towards the pump piston 26, in the zone of the annular grooves 31 and 32.

The end walls 21 and 22 are at a distance a from one another and bound an annular pumping chamber which is divided by the pump piston 26 into piston chambers 36 and 37.

A coupling block 38 which is integral with the end wall 21 has a valved inlet 39 and a valved outlet 40. The valved outlet 40 communicates with the piston chamber 36 by an outlet channel 41, while the valved outlet 39 is in communication with the piston chamber 36 by an inlet channel 45a.

A coupling block 42 which is integral with the end wall 22 has a valved inlet 43 and a valved outlet 44. The valved outlet 44 communicates with the piston chamber 37 by an outlet channel 45, while the valved inlet 43 is in communication with the piston chamber 37 by an inlet channel 41a.

For operating the above-described pump, the energizing coils 1 and 2 are supplied with a direct current and the control coil 3 is supplied with an alternating current as explained in connection with FIGS. 1, 2 and 3. As, for example, the pump piston 26 is moved by the force K in the direction of the end wall 21, the liquid helium, introduced into the piston chamber 36 during a preceding operational step, is driven from the piston chamber 36 through the outlet channel 41 into and out of the valved outlet 40. At the same time, through the valved inlet 43 and the inlet channel 41a liquid helium is drawn by the piston 26 into the piston chamber 37. Upon reversal of the direction of motion of the pump piston 26, the piston chamber 37 is emptied through the valved outlet 44 and simultaneously, the piston chamber 36 is filled with liquid helium through the valved inlet 39. The valved of the valved inlets and outlets 39,40,43 and 44 are structured as spherical check valves. It is understood that other types of valves (for example, flutter valves) may be used.

The dead space, that is, the liquid helium volume remaining in either of the piston chambers 36 or 37 in the respective end position of the piston 26 is only approximately 50 cm$^3$, that is, 5% of the volume pumped during one stroke.

The annular space 46 enclosed by the ring 23 and by the bellows 29 and 30 is in communication with the outlet 40 by means of a pressure equalizing conduit 47 to ensure that in the space 46 the operational pressure prevails. In this manner, the maximum pressure stress affecting the bellows 29, 30 is limited to the differential pressure between the inlet and the outlet. The current supply of the control coil 3 is effected by two superconducting wires 48 which are sealed liquid helium tight in a flexible tube 49 and which pass through the end wall 22 from the annular chamber 46. The flexible tube 49 is freely movably arranged in the annular chamber 46 and passed through the ring 28 through a bore 49a which is offset at least 180° with respect to the passage which is provided in the end wall 22 and through which the wires 48 are brought out of the annular chamber 46. The current leads for the coils 1 and 2 are not shown.

In a liquid helium pump which is structured according to FIG. 4 and which has a pump piston surface of A=200 cm$^2$, a stroke of 50 mm and a frequency of 1 Hz, there is obtained a pump output of 2 liter/sec and a maximum pressure difference of 7600 N/200 cm$^2 \sim 4$ bar.

Figure 5A:
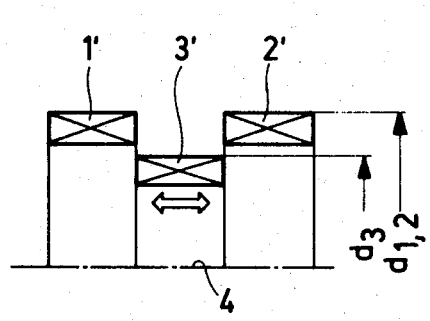
FIGS. 5a and 5b are diagrammatic views illustrating variants of the coils forming part of the preferred embodiment.
Figure 5B:
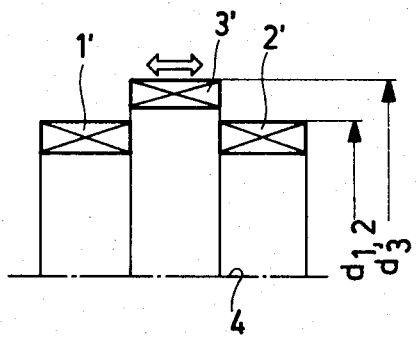

According to the arrangement in FIGS. 5a and 5b, the energizing coils 1' and 2' as well as the control coil 3' are cylinder coils which are arranged coaxially with respect to the axis 4. The diameter $d_3$ of the control coil 3' may be smaller (FIG. 5a) or greater (FIG. 5b) than the diameters $d_{1,2}$ of the energizing coils 1' and 2'.

Figure 6:
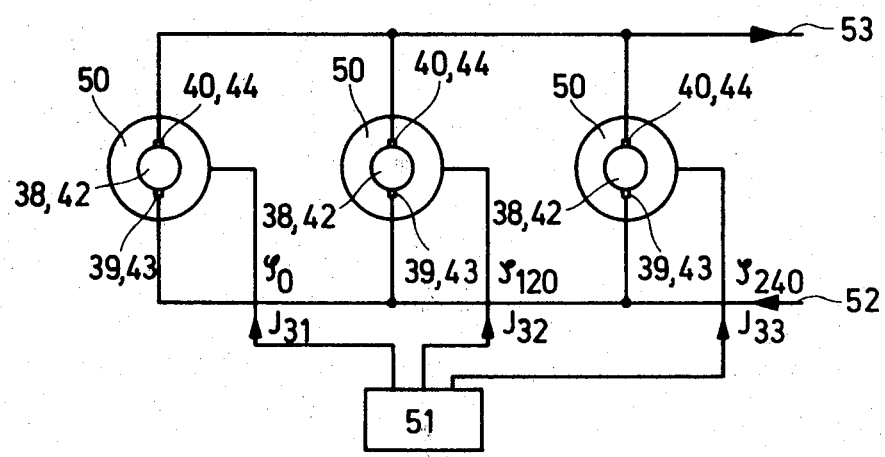
FIG. 6 is a diagram illustrating a plurality of liquid helium pumps according to the invention, operated in a parallel-connected arrangement.

In FIG. 6 there are diagrammatically shown three identical liquid helium pumps 50 in a parallel connection, that is, the valved inlets 39 and 43 of each pump communicate with a common intake conduit 52 whereas the valved outlets 40 and 44 of each pump communicate with a common output conduit 53. The currents $J_{31}$, $J_{32}$ and $J_{33}$ (varying as a cosine function) of the control coils 3 of the three respective liquid helium pumps 50 are set by a phase shifter 51 such that the current $J_{31}$ has the phase position $\phi_0$, the current $J_{32}$ has the phase position $\phi_{120}$ whereas the current $J_{33}$ has the phase position $\phi_{240}$. The phase shift between any two currents is thus 120°. Stated more generally, the phase shift between the currents of the control coils 3 is 360° divided by the number of the liquid helium pumps. By means of this arrangement, the differential in pressure between the liquid helium intake conduit 52 and the liquid helium output conduit 53 may be maintained constant.

It will be understood that the above description of the present invention is susceptible to various modifications, changes and adaptations, and the same are intended to be comprehended within the meaning and range of equivalents of the appended claims.

What is claimed is:

1. In a pump for driving a liquid, including a pump housing defining a pumping chamber and having opposite first and second end walls bounding said pumping chamber; a piston arranged in the pumping chamber for alternating motion towards and away from the end walls; said piston having a piston axis extending parallel to the path of motion of said piston; inlet means and outlet means for providing a passage for the liquid into and out of the pumping chamber; and an electromagnetic drive means for reciprocating said piston, whereby liquid is drawn into and driven out of said pumping chamber through said inlet means and said outlet means, respectively, the improvement comprising (a) first and second energizing coils mounted on the first and second end walls for generating a first and a second electromagnetic field in said pumping chamber; said energizing coils being at a predetermined distance from one another across said pumping chamber and further being coaxial with said piston axis;

(b) a control coil fixedly mounted on said piston for generating a third electromagnetic field in said pumping chamber; said control coil being coaxial with said piston axis; said energizing coils and said control coil forming part of said electromagnetic drive means for generating, in said pumping chamber, an electromagnetic force propelling said piston back and forth between said end walls; and (c) a bellows affixed to peripheral regions of said piston and to said end walls; said bellows enclosing said pumping chamber.

2. A pump as defined in claim 1, wherein said energizing coils and said control coil are superconducting and are arranged to be exposed to direct contact by said liquid and further wherein said liquid is liquid helium.

3. A pump as defined in claim 1, wherein said energizing coils and said control coil are disc-shaped and have identical diameters.

4. A pump as defined in claim 1, wherein said energizing coils are cylindrical and have identical diameters and further wherein said control coil is cylindrical and has a diameter different from that of said energizing coils.

5. A pump as defined in claim 1, wherein said piston divides said pumping chamber into a first and a second piston chamber situated on opposite sides of said piston; further wherein said inlet means comprises a first and a second valved inlet communicating with said first and second piston chamber, respectively, and said outlet means comprises a first and a second valved outlet communicating with said first and second piston chamber, respectively; whereby said piston, upon movement towards said first end wall, draws liquid into said second piston chamber through said second valved inlet and expels liquid from said first piston chamber through said first valved outlet and further whereby said piston, upon movement towards said second end wall, draws liquid into said first piston chamber through said first valved inlet and expels liquid from said second piston chamber through said second valved outlet.

6. A pump as defined in claim 5, further comprising first and second coupling blocks integral with said first and second end wall, respectively; said first coupling block containing said first valved inlet and said first valved outlet and said second coupling block containing said second valved inlet and said second valved outlet.

7. A pump as defined in claim 1, wherein said pump housing has an axis coinciding with the axes of said coils and further wherein said first and second end walls are bodies that are rotationally symmetrical with respect to said axis of said pump housing.

8. In a pump system for driving a liquid, including a plurality of interconnected pumps; each pump including a pump housing defining a pumping chamber and having two opposite end walls bounding said pumping chamber, a piston arranged in the pumping chamber for alternating motion towards and away from the end walls; said piston having a piston axis extending parallel to the path of motion of said piston; inlet means and outlet means for providing a passage for the liquid into and out of the pumping chamber and an electromagnetic drive means for reciprocating said piston, whereby liquid is drawn into and driven out of said pumping chamber through said inlet means and said outlet means, respectively, the improvement comprising (a) first and second energizing coils mounted on the one and the other said end walls of each pump for generating a first and a second electromagnetic field in said pumping chamber of each pump; said energizing coils being at a predetermined distance from one another across said pumping chamber and further being coaxial with said piston axis;

(b) a control coil fixedly mounted on said piston of each pump for generating a third magnetic field in said pumping chamber; said control coil being coaxial with said piston axis; said energizing coils and said control coil forming part of said electromagnetic drive means for generating, in said pumping chamber of each pump an electromagnetic force propelling said piston back and forth between said end walls;

(c) a bellows affixed to peripheral regions of said piston and to said end walls of each pump; said bellows enclosing said pumping chamber of the respective pump;

(d) a common intake conduit and a common output conduit communicating, respectively, with said inlet means and said outlet means of each pump, whereby said pumps are arranged in a parallel connection; and (e) a phase shifter means connected to said control coil of each pump for supplying the control coils with respective alternating currents having a phase shift of 360° divided by the number of pumps in said pump system.

* * * * *